Sept. 21, 1937.                J. W. LOGAN, JR                2,093,459
        PROTECTIVE DEVICE FOR ELECTROMAGNETIC TRACK BRAKE SYSTEMS
                            Filed July 6, 1935
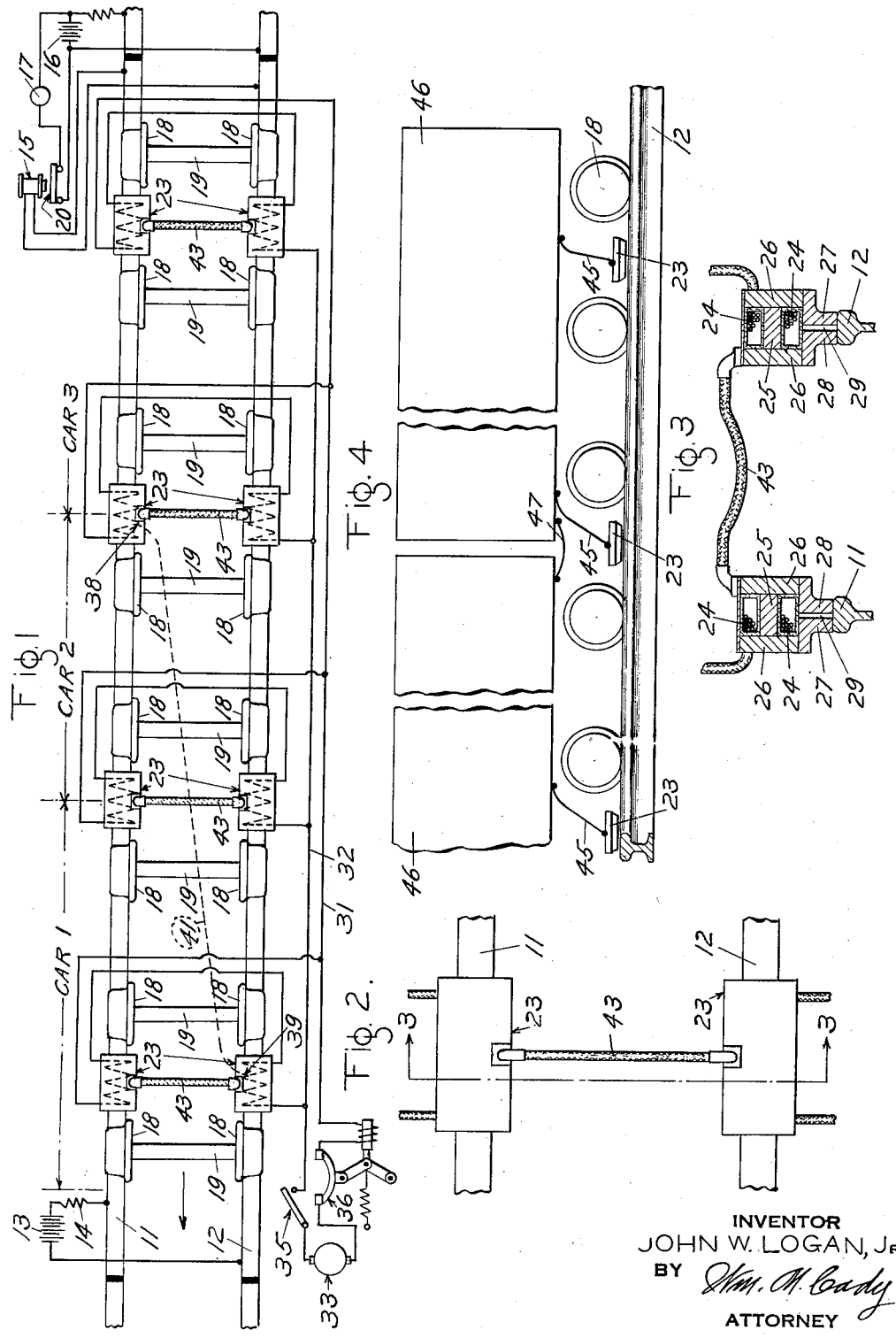
INVENTOR
JOHN W. LOGAN, JR.
BY
ATTORNEY Patented Sept. 21, 1937

2,093,459

UNITED STATES PATENT OFFICE 2,093,459

PROTECTIVE DEVICE FOR ELECTROMAGNETIC TRACK BRAKE SYSTEMS

John W. Logan, Jr., Forest Hills, Pa., assignor to The Westinghouse Air Brake Company, Wilmerding, Pa., a corporation of Pennsylvania Application July 6, 1935, Serial No. 30,111

7 Claims. (Cl. 246—41)

This invention relates to electromagnetic track brake systems, and particularly to protective devices for electromagnetic track brake systems.

It has been found that there is danger of interference with track signal operations, in the case of self-propelled trains having the electromagnet coils of the track brake shoes operating on a circuit self-contained on the cars, which trains operate over track equipped with well known signal circuits including the rails of the track, such as commonly employed on steam railroads. This interference with signal operations may occur in the event of concurrent break-down of the insulation on electromagnet coils of track brake shoes engageable with opposite rails of the track and the consequent grounding of the electromagnet coils to the track brake shoes. In such case a short-circuit path is established in the energizing circuit for the electromagnet coils, which path extends from the track brake shoe engageable with one rail to the track brake shoe engageable with the opposite rail, through the car wheel trucks, car frames, car couplers and other contacting metallic parts of the car. The electrical conductivity of this short-circuit path is relatively poor, that is, it is of relatively high resistance, especially since the track brake shoes have a movable jointure to the car wheel trucks or car frames.

If now, with the track shoe electromagnet coils grounded, as just described, and with the circuit, on which the coils operate, energized, the track shoes are caused to engage the rails, as when braking with the track brakes, it will be seen that the short-circuit path of relatively high resistance is connected across the rails and that it is thus connected in parallel relation in the track circuit. The voltage drop across the high resistance short-circuit path occasioned by the flow of current therethrough from the energizing circuit of the electromagnet coils is thus imposed on or in the track signal circuit. Consequently, in spite of the shunting of the track rails through the car wheels and axles, which is normally effective to cause drop-out of the usual signal relays to indicate that the train is in the track block or section, this undesired additional voltage may suffice to prevent the drop-out, and even to cause pick-up, of the track signal relays so that a false "clear" signal is given, with the train in the track block or section.

The primary object of my invention is, therefore, to guard against interference with the proper functioning of track signal circuits resulting in a "clear" signal being falsely displayed, occasioned as a result of grounding of the magnet coils of electromagnetic track brake shoes, which coils operate on a circuit self-contained on the cars.

More specifically, it is an object of my invention to provide protective means for reducing to a minimum the resistance of a short-circuit path through the car structure, set up by concurrent grounding to the track shoe and car structure of at least two track brake shoe electromagnet coils, so that undesired voltages imposed across the rails from the electromagnet coil circuit, when the track shoes engage the rails, will be a minimum and so that the possibility of the occurrence of false "clear" track signals may, therefore, be reduced to a minimum.

The above objects and other objects of my invention, which will be made apparent hereinafter, are attained by means of illustrative embodiments of my invention, described hereinafter and shown in the accompanying drawing, wherein Figure 1 is a diagrammatic view, showing a simplified track signal circuit and a control circuit for the electromagnet coils of track brake shoe devices on the cars of the train, and one form of my invention employed in connection therewith, Figure 2 is an enlarged plan view of the form of my invention shown in Figure 1, Figure 3 is a sectional view, taken on line 3—3 of Figure 2, and Figure 4 is a diagrammatic view, showing a modified form of my invention, as applied to articulated cars.

Referring to Figure 1, a section of track is shown comprising a pair of rails 11 and 12, suitably insulated from each other and, at opposite ends, from the adjacent rail sections. A simplified track signal circuit is shown in connection with the rails 11 and 12, a source of current, such as the battery 13 being connected across the rails at one point, through a resistor 14, and a track signal relay 15 being connected across the rails at another point.

When no train occupies the block or section of track comprising rails 11 and 12, the voltage impressed across the rails by the battery 13 is sufficiently high at the point of connection of the signal relay 15 to the rails, to actuate the signal relay 15 to interrupt a local circuit including a battery 16, which may be the battery for the adjacent track section corresponding to battery 13, and a signal lamp 17. When a train enters the section of track, going for example in the direction indicated by the arrow between the rails, the wheels 18 and axles 19 of the cars establish a short-circuit connection across the rails and thus effect a drop in the voltage across the signal relay 15, resulting in the release of the movable armature 20 of the relay, which armature then closes the local circuit through the signal lamp 17. Thus, as long as the train occupies the section of track comprising rails 11 and 12, the signal lamp 17 is illuminated to indicate to the engineman on a train following in the rear, that the forward train is in the block ahead. When the train passes out of the section of track comprising rails 11 and 12, the short-circuit connection across the rails effected through the wheels and axles of the cars, is removed and as a result, signal relay 15 is again actuatively energized to move the armature 20 and thus interrupt the local circuit through the signal lamp 17, the absence of illumination of the signal lamp being taken as a "clear" signal indicating to the engineman of a train following in the rear that the forward train is out of the block ahead.

Diagrammatically shown in Figure 1 are electromagnetic track brake shoe devices 23, which are suitably mounted, for movement into and out of engagement with the rails, on the cars of the train or on the wheel trucks of the cars, the cars being indicated as of the articulated type. As shown in Figure 1, each of the four-wheel trucks has associated therewith a pair of track brake shoe devices 23, one of the pair being disposed between the forward and the rear wheels on one side of the truck and the other of the pair being disposed between the forward and rear wheels on the opposite side of the truck. It should be understood that my invention is not limited, in its application, to articulated cars, but may be employed in connection with any cars however they may be coupled.

The track brake shoe devices 23 may be of any suitable construction, and as shown in Figure 3, may comprise a magnet coil 24 wound around a suitable magnet core 25 and insulated therefrom, and magnetic structure comprising side pieces 26 and track-engaging pole-pieces 27 and 28 extending longitudinally of the rails and secured in any suitable manner to the core, with a gap 29 therebetween, which gap is preferably filled with a non-magnetic metal or other material.

As shown in Figure 1, the pair of magnet coils 24, for each wheel truck, may be connected in series relation across a pair of conductors 31 and 32, which conductors are insulated from the car structure and which extend throughout the train, a source of energy, such as a direct-current generator 33, carried on the train, being adapted to supply current through conductors 31 and 32 to energize the magnet coils 24, upon closure of a suitable circuit-breaker or control switch 35. Overload protection for the circuit including the magnet coils 24 and the generator 33 may be obtained by means of an overload circuit-breaker 36, of well known construction, which is adapted to interrupt the magnet coil circuit in the event of excess current flowing in the circuit.

It will be understood that the train or cars are self-propelled by means of a suitable power unit on the train or cars, no propelling power being supplied from an external source through a trolley or third rail and the track rails. The circuit including the generator 33 and magnet coils 24, being confined to the train or cars, is thus referred to herein as being self-contained on the train or cars.

The condition which my invention seeks to obviate may now be illustrated by assuming that a break in the insulation of a magnet coil 24 adjacent the rail 11, at a point indicated at 38, occurs concurrently with a break in the insulation of one of the magnet coils 24 on the opposite side of the cars adjacent the rail 12, at a point indicated at 39. If an application of the track brake shoes is made and the track shoes are moved into engagement with the track rails while such a condition of insulation failure exists, it will be clear that a short-circuit path is established in the energizing circuit of the magnet coils between the points 38 and 39 on the magnet coils and extending through the track shoes, car frames and car couplers, as well as between the rails through the axle shunts on the cars, the track signal circuit, and the track ballast, which short-circuit connection is indicated by the broken line 41. Since the short-circuit path indicated by the broken line 41 is of relatively high resistance, the voltage drop between the points 38 and 39 occasioned by flow of current through the short-circuit path and supplied from the energizing circuit of the electromagnet coils, may be sufficient to actuatively energize the signal relay 15 to interrupt the local circuit through the signal lamp 17. Thus at a time when a train is in the track section comprising rails 11 and 12, and at a time when the signal relay 15 should be effective to close the local circuit through signal lamp 17 and cause a warning signal to be indicated, the undesired accidentally imposed potential from the circuit of the generator 33 will cause the signal relay 15 to effect a false "clear" signal.

In accordance with my invention, I provide a low-resistance connector or shunt 43, of suitable material such as copper, which is brazed, welded, or otherwise suitably secured at one end in a manner to obtain a low-resistance joint, to a convenient part, such as the casing, core or pole-pieces, of the track shoe device 23 on one side of a wheel truck adjacent rail 11, (see Figure 3) and similarly secured at the other end to the track shoe device 23 on the opposite side of the same wheel truck, adjacent rail 12. Each pair of track shoe devices associated with the different wheel trucks are similarly connected together by other low-resistance connectors 43.

In operation, assuming a ground on at least two of the magnet coils 24, as above described, and with the track shoes 23 engaging the rails, the connectors 43 connect the rails 11 and 12, and shunt the short-circuit path 41, of relatively high resistance, between the points 38 and 39. Since the connectors 43 establish a plurality of parallel low-resistance shunt connections across the rails, the total resistance between the points 38 and 39 is greatly reduced from what it would be but for the connectors 43. Consequently, the voltage between points 38 and 39 imposed across the rails 11 and 12, from the circuit of the magnet coils 24 and generator 33, is greatly reduced, the voltage being proportional to the total resistance between points 38 and 39. This reduction in the degree of the undesired voltage impressed across the rails 11 and 12, from the degree of voltage which would otherwise be impressed, effected by the connectors 43 is sufficient, in many cases, to limit the degree of the voltage to a value sufficiently low that it is ineffective to actuatively energize the signal relay 15 to interrupt the local circuit through the signal lamp 17. Consequently the signal lamp 17 is illuminated to give a true warning signal or indication that the train is in the track section, despite the concurrent insulation failure on magnet coils on opposite sides of the train.

It is appreciated that insulation failure of the magnet coils 24 may occur at such points on the magnet coils that even the low-resistance connectors 43 may be ineffective to prevent the imposition of a voltage across the rails, from the circuit of the magnet coils 24 and generator 33, which voltage is sufficient to actuatively energize the signal relay to open the circuit through the signal lamp 17. In such cases, of course, a false "clear" signal would be given at the time that a warning signal should be given, unless the short-circuit current would be high enough to cause the overload circuit-breaker 36 to interrupt the magnet coil circuit. Interruption of current to the magnet coils 24 would result in failure of the track brakes to properly brake the train, indicating to the engineman the faulty insulation condition.

The provision of the low-resistance connectors 43, according to my invention, however, prevents the occurrence of false "clear" signals in many instances where such false signals would otherwise be given.

Figure 4, a modified arrangement as applied to articulated metallic cars is shown, wherein each of the track shoe devices is connected by a low-resistance connector 45 to the frame of the cars 46, the frames of consecutive cars being also connected by one or more low-resistance connectors 47. Thus, in the event of the occurrence of the above-described condition of interference between the magnet coil circuit and the track signal circuit, the short-circuit path of relatively high resistance, indicated by the broken line 41, is shunted by a path of relatively low resistance through the car frame and the connectors 45 and 47, the effect as to limiting the degree of undesired voltage accidentally imposed across the rails being similar to that described above for the low-resistance connectors 43.

It will be apparent, of course, that all of the connectors 43, 45 and 47 may be employed, in which case a low-resistance shunt connection is provided having lesser resistance than in either of the embodiments shown in Figure 1 or Figure 4 respectively. It will be apparent also, that in the event of the application of my invention to non-articulated cars, the connectors 47 will necessarily be manually or automatically separable from the cars.

While the connectors 43, 45 and 47 are intended primarily for protecting against interference with signal operations occasioned upon the occurrence of insulation failure of the track brake shoe electromagnet coils, it should be understood that they also serve to insure the drop-out of the signal relays to indicate that a train occupies a track block or section, at times when no condition of insulation failure exists. This is so because with the track brake shoes applied to the rails, the low-resistance shunt across the track rails, effected by the connectors 43, 45 and 47, serves to greatly reduce the total resistance of the track shunt relative to the resistance of the wheel and axle shunts operating alone. Consequently drop-out of the signal relays is more effectively insured.

It will thus be seen that I have provided means for reducing the possibility of the occurrence of false signals on a track signal circuit due to undesired accidental imposition of voltages across the track rails as a result of insulation failure and grounding of the magnet coils of electromagnetic track brake shoe devices. It should furthermore be understood, that while I have shown only two embodiments of my invention, various omissions, additions or modifications may be made therein without departing from the spirit of the invention, such as, for example, providing a low-resistance conductor extending throughout the train of cars to which the connectors 45 are connected instead of being connected to the car frames. It is not my intention, therefore, to limit the scope of my invention, except as necessitated by the prior art and as defined in the appended claims.

Having now described my invention, what I claim as new and desire to secure by Letters Patent, is:

1. In a track brake system, the method of preventing interference with the proper operation of a track circuit signal system occasioned as a result of the accidental imposition, in the track circuit, of voltage from a brake control circuit self-contained on a car, the voltage being in accordance with the resistance of a short-circuit path, of relatively high resistance, in the self-contained circuit, which method consists in establishing a low-resistance path in shunting relation to the said short-circuit path, to limit the degree of voltage imposed in the signal circuit from the self-contained circuit on the car.

2. In an electromagnetic track brake system, protective means for preventing the occurrence of false signals on a track circuit signal system, occasioned as a result of the accidental imposition, across the track rails, of voltages from a brake control circuit self-contained on a train of cars, said means comprising low-resistance means, carried on the cars, adapted to connect the opposite rails and effective to reduce the voltage which would otherwise be accidentally imposed across the rails.

3. In combination, a car track having spaced rails, a signal circuit system including the track rails, a car movable on the track, a pair of track brake shoes carried on the car and adapted to engage opposite rails, respectively, electromagnet coils for said shoes, said coils operating on a circuit self-contained on the car, and means for preventing the occurrence of false signals in the signal system occasioned as a result of undesired voltages from the self-contained circuit on the car being accidentally impressed across the rails, said means including means carried on the car for providing a relatively low-resistance connection between the rails and thereby limiting the degree of undesired voltage impressed across the rails.

4. In combination, a car track having spaced rails, a signal circuit system including the track rails, a car movable on the track, a pair of track brake shoes carried on the car and adapted to engage opposite rails, respectively, electromagnet coils for said shoes, said coils operating on a circuit self-contained on the car, and means for preventing the occurrence of false signals in the signal system occasioned as a result of undesired voltages from the self-contained circuit on the car being accidentally impressed across the rails, said means including low-resistance means carried on the car and interconnecting the said pair of track shoes, said low-resistance means being adapted to provide a low-resistance connection between the opposite rails, when the said track shoes engage the rails, to limit the degree of undesired voltage impressed across the rails.

5. In combination, a car track having spaced rails, a signal circuit system including the track rails, a plurality of coupled cars movable on the track, a plurality of pairs of track shoes carried on said cars, the track shoes of each pair being adapted to respectively engage opposite rails, electromagnet coils, one for each of said track shoes, said coils operating on a circuit self-contained on the cars, and means for preventing the occurrence of false signals in the signal circuit system occasioned by voltages from the self-contained circuit being accidentally impressed across the rails, said means comprising low-resistance conductors connecting each of the track shoes to the frame of the car on which it is carried, and low-resistance conductors connecting the frames of the cars, whereby a relatively low-resistance path is established connecting the opposite rails when the track shoes engage the rails.

6. In combination, a track having a pair of rails, a car movable on the track, a signal circuit including the track rails, means operating on said circuit responsive to the shunting of the rails by the car for indicating the presence of the car on the track, and means for reducing the resistance of the shunt connection across the rails effected by the car, said means including at least two track brake shoes carried on the car and adapted to be moved into contact with the opposite rails, respectively, and low-resistance means connecting said track shoes.

7. The combination of a pair of magnetic track brake shoes on a car which runs on a track having a signal system including a track circuit, said track brake shoes being movable into engagement with the opposite rails of the track respectively, electromagnet coils for said track brake shoes, a circuit on the car for energizing the said electromagnet coils, and means for preventing the occurrence of false signal indications by the signal system due to the undesired imposition of voltage from a short-circuit path in the electromagnet coil energizing circuit on the track circuit caused by the engagement of the track brake shoes with the track rails at a time when there is a failure of insulation on both of the electromagnet coils, said means including a low-resistance connector connecting said pair of track brake shoes and effective to provide a low-resistance electrical connection between the opposite rails of the track, when the track brake shoes engage the rails, so as to shunt the short-circuit path and consequently limit the voltage drop thereacross, which voltage drop represents the undesired voltage imposed on the track circuit.

JOHN W. LOGAN, Jr.